United States Patent
Ripoll Lorenzo et al.

(10) Patent No.: US 11,333,872 B2
(45) Date of Patent: May 17, 2022

(54) ROTARY OBJECTIVE LENS SWITCHING DEVICE FOR A PLANAR LASER BEAM MICROSCOPE

(71) Applicant: Universidad Carlos III De Madrid, Leganes (ES)

(72) Inventors: Jorge Ripoll Lorenzo, Leganes (ES); Alicia Arranz De Miguel, Leganes (ES)

(73) Assignee: Universidad Carlos III De Madrid, Leganes (ES)

( * ) Notice: Subject to any disclaimer, the term of this patent is extended or adjusted under 35 U.S.C. 154(b) by 244 days.

(21) Appl. No.: 16/635,942

(22) PCT Filed: Jul. 5, 2018

(86) PCT No.: PCT/ES2018/070483
§ 371 (c)(1),
(2) Date: Jan. 31, 2020

(87) PCT Pub. No.: WO2019/008212
PCT Pub. Date: Jan. 10, 2019

(65) Prior Publication Data
US 2020/0218048 A1    Jul. 9, 2020

(30) Foreign Application Priority Data
Jul. 4, 2017   (ES) ................ P201730887

(51) Int. Cl.
*G02B 21/06*     (2006.01)
*G02B 21/02*     (2006.01)
*G02B 21/16*     (2006.01)

(52) U.S. Cl.
CPC ............. *G02B 21/02* (2013.01); *G02B 21/06* (2013.01); *G02B 21/16* (2013.01)

(58) Field of Classification Search
CPC ........ G02B 21/02; G02B 21/06; G02B 21/16; G02B 21/34; G01N 1/28; G01N 1/36;
(Continued)

(56) References Cited

U.S. PATENT DOCUMENTS 4,443,104 A * 4/1984 Ringhardtz ............ G01N 21/03
250/461.2
4,619,530 A * 10/1986 Meserol ............... G01N 21/255
356/246
(Continued)

FOREIGN PATENT DOCUMENTS

JP    2003-195177 A    7/2003
KR    20140068640 A    6/2014

OTHER PUBLICATIONS

International Search Report for PCT Application No. PCT/ES2018/070483, dated Dec. 20, 2018 in 4 pages.

*Primary Examiner* — Arnel C Lavarias
(74) *Attorney, Agent, or Firm* — Knobbe, Martens, Olson & Bear, LLP

(57) ABSTRACT

An objective lens switching device includes a prismatic cuvette perpendicular to a plane parallel to a direction of detection and a lighting direction, which are mutually perpendicular. The cross-section of the prism is a polygon with more than four sides with pairs of mutually perpendicular faces. At least several pairs of faces include one face designed to receive a planar light beam in the lighting direction and one face with a coupled lens or objective lens to detect fluorescent light in the direction of detection. The cuvette can rotate about an axis perpendicular to said plane, allowing a specific objective lens to be oriented in the direction of detection.

10 Claims, 4 Drawing Sheets

US 11,333,872 B2

Page 2

(58) Field of Classification Search
CPC ............... G01N 21/03; G01N 21/0303; G01N 2021/0307; G01N 2021/0357; G01N 2021/0378; G01N 2021/0389
USPC ....... 359/385, 362, 363, 368, 369, 396, 398; 435/289.1, 292.1, 304.1, 305.1; 436/46; 356/244, 246
See application file for complete search history.

(56) References Cited

U.S. PATENT DOCUMENTS

| | | | |
|---|---|---|---|
| 5,658,532 A * | 8/1997 | Kurosaki | G01N 35/04 |
| | | | 215/371 |
| 5,818,637 A | 10/1998 | Hoover et al. | |
| 7,554,725 B2 | 6/2009 | Stelzer et al. | |
| 2004/0061072 A1 | 4/2004 | Gu et al. | |
| 2008/0124778 A1* | 5/2008 | Ragsdale | C12M 35/02 |
| | | | 435/173.6 |
| 2015/0008339 A1* | 1/2015 | French | G01N 21/6486 |
| | | | 250/458.1 |
| 2017/0029756 A1* | 2/2017 | Nagaike | C12M 23/08 |
| 2017/0369833 A1* | 12/2017 | Kamiya | B25J 21/00 |
| 2019/0383719 A1* | 12/2019 | Corbett | G01N 21/0303 |
| 2020/0264050 A1* | 8/2020 | Auner | G01N 21/65 |

* cited by examiner

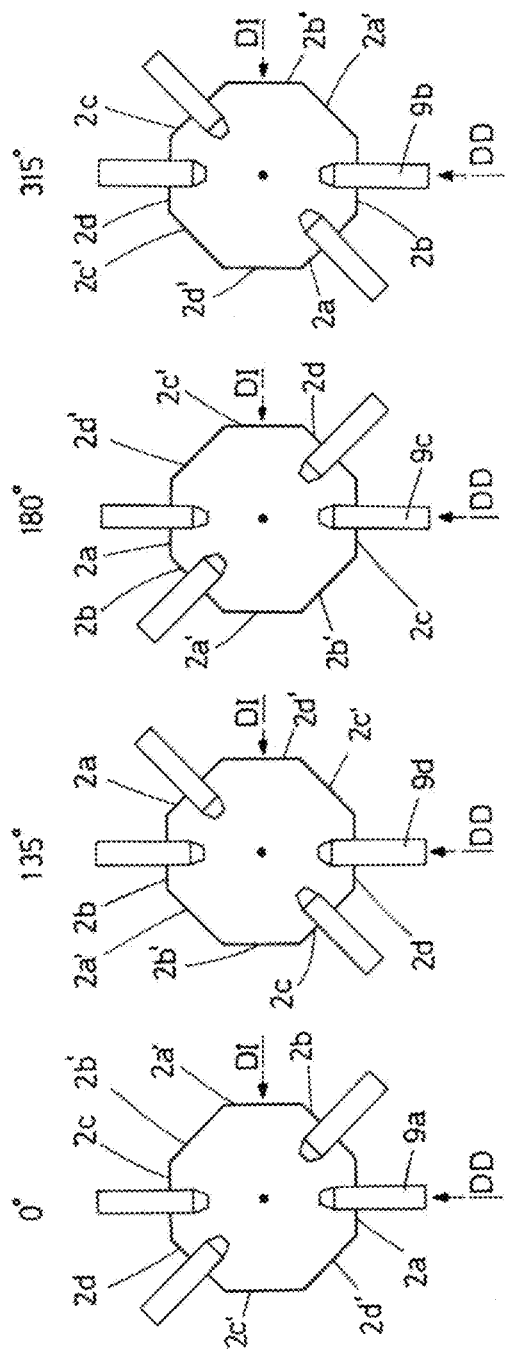

ROTARY OBJECTIVE LENS SWITCHING DEVICE FOR A PLANAR LASER BEAM MICROSCOPE

CROSS-REFERENCE TO RELATED APPLICATIONS

This application is the U.S. National Phase under 35. U.S.C. § 371 of International Application PCT/ES2018/070483, filed Jul. 5, 2018, which claims priority to Spanish Patent Application No. P201730887, filed Jul. 4, 2017. The disclosures of the above-described applications are hereby incorporated by reference in their entirety.

OBJECT OF THE INVENTION

The present invention belongs to the field of microscopy, and more particularly to planar laser beam illumination microscopy used to obtain images of several transparent or semi-transparent samples such as embryos, tissues and other biological samples.

The object of the present invention is a novel device which enables the objective lens to be switched quickly and easily via rotations of the cuvette itself.

BACKGROUND OF THE INVENTION

Studies on embryos and similar biological samples through an optical microscope have, unlike what happens with individual cells, particular problems related to light absorption and the loss of resolution due to light scattering. In order to solve these problems, important improvements have been developed in recent years for planar laser beam microscopes, the precursor invention being a planar light beam microscope dating from 1903.

A planar laser beam microscope is essentially formed by a camera coupled to an objective lens with a high numerical aperture and arranged in a direction called the "direction of detection", and lighting means capable of emitting a thin sheet of light in a direction called the "lighting direction" which is perpendicular to the direction of detection, following the original configuration of Siedentopf and Zsigmondy coupled to a detection camera. With this configuration, the camera can obtain a 2D fluorescence image of the portion of the sample illuminated by the lighting sheet or plane. If the sample is also moved in the direction of the axis of detection and several 2D images are taken in different positions, a set or stack of 2D images is generated wherein each of the 2D images corresponds to a position of the lighting plane with respect to the sample. This stack of 2D images contains information about the z position (depth of the sample in the direction of detection) obtained when moving the sample, and about the x and y positions, present in each 2D image. The 2D image stack can then be merged to generate a 3D image of the sample, as described in U.S. Pat. No. 7,554,725 of Stelzer et al. Subsequently, it was proposed to rotate the sample about its own axis, normally the vertical one, in order to capture several stacks of 2D images (commonly called "angular measurements") and merge them afterwards, which enables the anisotropy and image quality to be improved (S. Preibisch et al, Nature Methods 7 (2010)).

For a clearer understanding of this technique, FIGS. 1a and 1b are attached which show an example of a planar laser beam microscope (100). The sample (107) is arranged in a support (101) inside a cuvette (102) filled with a liquid. A linear Gaussian, Bessel, Airy or similar illumination beam (103) strikes a cylindrical lens (104) which focuses it thanks to a lighting objective lens (105) in order to generate the of vertical planar lighting sheet (106). This vertical planar lighting sheet (106) strikes the sample (107) according to the lighting direction (DI), and the fluorescent light (108) emitted by that specific plane of the sample (107) is collected by a detection objective lens (109) oriented according to the direction of detection (DD), which is perpendicular to the lighting direction (DI). The support (101) can rotate about the vertical axis thereof in order to enable several angular measurements to be taken in accordance with the technique proposed by Preibisch.

On the other hand, the OPT technique (Optical Projection Tomography), described in document US20060122498 A1, is relatively similar to X-ray tomography. It is mainly based on optically illuminating the sample in a homogeneous manner and obtaining, on the side of the sample opposite from that which is illuminated, an image that can be similar to the "shadow" projected by the sample on a plane, or in the case of measuring fluorescence, the total emission of the illuminated volume. This "shadow" or fluorescence emission, normally called a projection image, has different shades of gray depending on the absorption of light and/or fluorescence emission that occurs in different portions of the sample. If the sample is illuminated from several angles, it is possible to implement a reconstruction algorithm on all the images obtained to generate a 3D image of said sample. This reconstruction algorithm is usually based on solving the Radon transform, originally developed for the 3D image with X-rays.

Recently, the inventors of the present application have filed patent application PCT/ES2015/070455 titled "Microscope and method for generating 3D images of a collection of samples" which describes a new microscope which combines the SPIM (Selective Plane Illumination Microscope) type planar laser beam technique with the Optical Projection Tomography (OPT) technique. This new microscope does not store a complete 2D image for each position of the lighting sheet, but for each acquisition angle it stores only one representative parameter of each pixel obtained by means of OPT techniques. This means that for each acquisition angle, a single 2D projection image is stored, instead of the entire stack of 2D images (such as in the planar laser beam technique). This enables not only the system requirements to be decreased, but also enables the acquisition speed of the microscope to be increased.

More recently, the inventors of the present application have filed patent application PCT/ES2016/070714, titled "Multiple-loading device for a planar laser beam microscope" which describes a multiple-loading device for supplying a planar laser beam microscope with a continuous and sequential flow of samples. This device fundamentally comprises a capillary tube that crosses the measuring zone of the sample-receiving cuvette of the microscope which has a diameter that only allows the samples to pass one by one; and an element for generating an adjustable flow which is connected to the capillary tube and is able to create a continuous and controllable flow of samples immersed in a fluid medium through said capillary tube. This enables a plurality of samples to be passed sequentially through the inside of the receiving cuvette, accelerating the process of acquiring data from multiple samples.

Even more recently, the inventors of the present application have filed the patent application PCT/ES2017/070028, titled "Automatic objective lens switching device for a planar laser beam microscope", which describes a device which enables the objective lens for acquiring images from a planar laser beam microscope to be switched depending on the magnification desired at any time. To do so, the device comprises supports for objective lenses coupled to lateral translation means and longitudinal translation means, so that the user can choose which specific objective lens faces the face of the cuvette oriented in the direction of detection.

This last device, although it enables the objective lens of the planar laser beam microscope to be switched, has the main drawback of the complexity of the mechanical assembly that must be performed. Furthermore, the control of the different drive elements that move the platforms is complex, since any miscalculation can cause the objective lenses to hit the cuvette.

DESCRIPTION OF THE INVENTION

The inventors of the present application solve the above problems thanks to a new objective lens switching device based on a rotary polygon-shaped cuvette wherein some faces have a coupled objective lens and other faces perpendicular to those faces are transparent. Thanks to this configuration, switching the objective lens only requires the cuvette to be rotated in order to place the face which has the desired objective lens oriented towards the direction of detection and the transparent face perpendicular to that face oriented towards the lighting direction. This prevents the possibility of impacts between the objective lenses and the cuvette, and also greatly simplifies the operations necessary for switching objective lenses.

It should be noted that, although in most cases switching an objective lens will be discussed, it would be equally possible to have a lens instead of an objective lens in the corresponding face of the pair of faces. Therefore, in this context it should be understood that every reference to a "face equipped with an objective lens" can also be interpreted as a "face equipped with a lens".

The present invention therefore describes a rotary objective lens switching device for a planar laser beam microscope comprising a cuvette having the shape of a prism with an axis perpendicular to a plane parallel to a direction of detection and a lighting direction. As usually occurs in planar laser beam microscopes, the direction of detection and the lighting direction are fixed and mutually perpendicular. The square cuvettes used until now in this field meet these conditions. However, the device of the present invention clearly differs from them due to the fact that it also has the following additional features:
  a) The shape of the cross section of the prism parallel to said plane is a polygon with more than four sides which has pairs of mutually perpendicular faces.
  b) Each pair of faces with at least several pairs of mutually perpendicular faces comprises one face designed to receive a planar light beam in order to illuminate a sample in the lighting direction and a face with a coupled lens or objective lens to detect fluorescent light emitted by the sample in the direction of detection.
  c) The cuvette can rotate about an axis perpendicular to said plane, allowing a specific lens or objective lens to be oriented in the direction of detection. Evidently, the face designed to receive the planar light beam is at the same time oriented in the lighting direction.

In fact, it is known that the direction of detection and the lighting direction form a 90° angle, such that it is necessary that the face of the cuvette through which the illumination beam enters is perpendicular to the face of the cuvette through which the fluorescent light emitted by the sample is received. Until now, this had been achieved by configuring the cuvette as simply as possible: with a cubic shape. This means that the cuvette conventionally used until now has the shape of a prism with a square cross section. These conventional cuvettes normally had a single objective lens which could be fastened to one of the faces thereof. If it was not fastened, the objective lens could be switched through complex mechanical systems such as the ones described in patent application PCT/ES2017/070028 of the same inventors as the present application.

The inventors of the present application have designed a new cuvette configuration which enables the lens or objective lens to be switched between several possible ones by simply rotating the cuvette. To do so, it is enough to increase the number of faces of the cuvette such that there are pairs of faces formed by mutually perpendicular faces. This means that the shape of the cross section of the cuvette goes from being square to having a shape of a polygon with more than four sides wherein there are several pairs of mutually perpendicular sides. It should be noted that it is not essential for the polygon to be regular, but only that it have several pairs of mutually perpendicular sides, for example two or more. It should also be noted that, by increasing the number of sides of the polygon, it is no longer necessary for the two sides making up a pair of mutually perpendicular sides to be adjacent, as was the case with the conventional cube-shaped cuvette.

Each pair of mutually perpendicular faces is formed by a face designed to receive the planar laser beam and a face equipped with a fixed lens or objective lens. The first one allows the passage of the planar illumination beam used to illuminate the sample in the planar laser beam microscopes in the lighting direction. The second one, equipped with a fixed lens or objective lens, enables the fluorescent light emitted by the sample to be collected in the direction of detection. Furthermore, since the cuvette can rotate, there are different use positions corresponding to the alignment of a specific pair of faces with respect to the directions of detection and lighting. In order to change the lens or objective lens, it is only necessary to rotate the cuvette a certain angle about an axis perpendicular to a plane containing the lighting direction and the direction of detection. The rotation of the cuvette can be performed using suitable drive means, such as a small reduction motor controlled by processing means.

The simplest configuration of this invention implies that the cross section of the prismatic cuvette has the shape of a regular polygon with a number of faces that is a multiple of four. Although it is not essential, the use of a regular polygon is the simplest and most intuitive alternative. Within the category of regular polygons, it has been demonstrated that those with a number of faces that is a multiple of four have pairs of mutually perpendicular faces. More preferably, the regular polygon is an octahedron, a dodecahedron, or a hexadecahedron. While it would be possible to use polygons with a larger number of faces, the size of the cuvette could be too large in that case.

In a preferred embodiment of the invention, the face designed to receive a planar light beam in order to illuminate a sample in the lighting direction is a planar transparent face. It could simply be a smooth planar wall made of glass or any other transparent material that would enable the planar laser beam to pass through without altering it. In an alternative embodiment of the invention, the face designed to receive a planar light beam in order to illuminate a sample according to the lighting direction comprises a lighting objective lens, which can use immersion or air. Lighting objective lenses are sometimes used to focus or treat in another manner the planar light beam emitted in the lighting direction.

Preferably, the front end of at least one objective lens crosses through a wall of the face to which it is coupled. This configuration corresponds to the use of so-called "immersion" objective lenses, which are objective lenses that require the front end thereof, the one through which light enters, to be introduced into the fluid wherein the sample is immersed. In this manner, the fluid is the only medium between the objective lens and the sample. Therefore, the front end of the objective lens crosses through the wall of the corresponding face and is immersed in the fluid supporting the sample.

In another preferred embodiment of the invention, the front end of at least one objective lens is externally adjacent to a wall of the face to which it is coupled. This configuration corresponds to the use of the so-called "air" objective lenses, which are objective lenses that may have the front end thereof outside of the fluid wherein the sample is immersed. In this case, the light entering the objective lens crosses through the fluid supporting the sample, the wall of the corresponding face of the cuvette, and the air separating the front end of the objective lens from the wall of the cuvette.

Of course, it is possible to arrange in one same cuvette pairs of faces with different combinations of lenses, "immersion" objective lenses, and "air" objective lenses on one face and planar transparent faces and faces equipped with a lighting objective lens on the other, thus equipping the device of the invention with high flexibility. Moreover, the fastening of the lenses or objective lenses to the faces of the cuvette can be performed in any manner known in the art.

In another preferred embodiment of the invention, the device comprises at least one additional cuvette which has the same cross-sectional shape as the cuvette and which is fastened to said cuvette such that each face of the additional cuvette is coplanar with a corresponding face of the cuvette. In other words, the additional cuvette is positioned above or below the original main cuvette, and the faces thereof are oriented in the same manner as the faces of the original main cuvette. In this manner, the pair of cuvettes as a set continues to have the same prism shape that the original main cuvette had by itself, although with a greater height. Furthermore, those faces of the additional cuvette which are coplanar with faces with a lens or objective lens of the original main cuvette also have a coupled lens or objective lens. The cuvette and the additional cuvette can rotate in an integral manner such that it is possible to simultaneously orient a specific lens or objective lens of the cuvette and a specific lens or objective lens of the additional cuvette in the direction of detection. This configuration enables two or more simultaneous images to be taken of a large sample.

BRIEF DESCRIPTION OF THE FIGURES

FIGS. 3a-3d show corresponding top views of the four possible use positions of the first example of a device of FIGS. 2a and 2b.

PREFERRED EMBODIMENT OF THE INVENTION

Figure 1A:
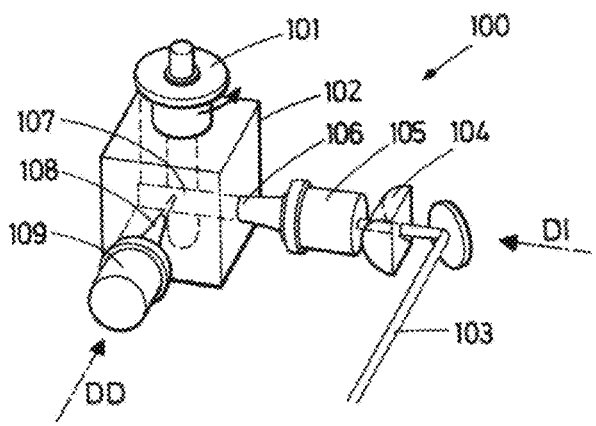
FIGS. 1a and 1b respectively show a perspective view and a top view of the main elements of a conventional planar laser beam microscope.
Figure 1B:
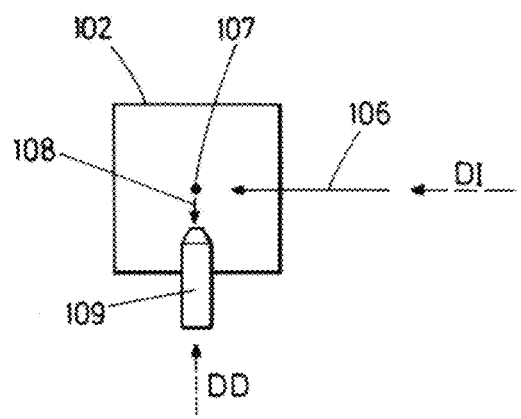
Figure 2A:
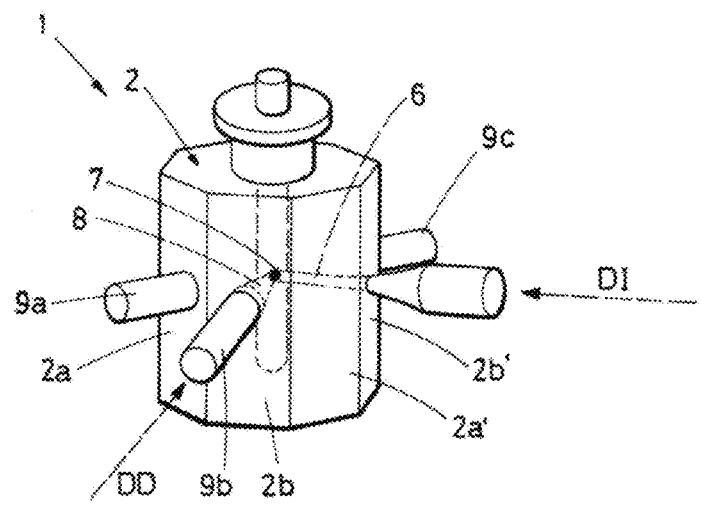
FIGS. 2a and 2b respectively show a perspective view and a top view of the main elements of a first example of a device according to the present invention.
Figure 2B:
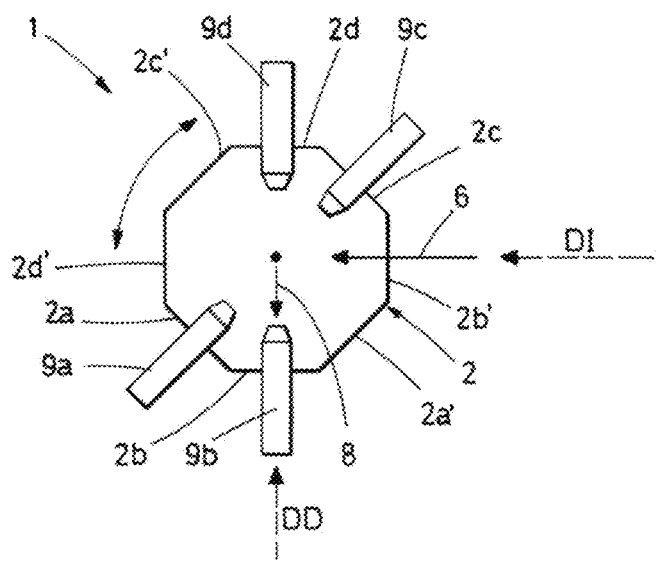

FIGS. 2a and 2b show a first example of a device (1) according to the present invention comprising a cuvette (2) which has the shape of an octahedron. An octahedron is a regular polygon formed by 8 faces wherein adjacent faces form a 45° angle and where alternating faces form a 90° angle. Therefore, alternating faces (2a, 2a'; 2b, 2b'; 2c, 2c'; 2d, 2d') of the cuvette (2) are mutually perpendicular. Specifically, FIG. 2a shows a perspective view of the cuvette (2) wherein a certain pair of faces (2b, 2b') is in the use position. Specifically, the pair of faces (2b, 2b') comprises a first face (2b) oriented in the direction of detection (DD), which is in the foreground, and a second face oriented in the lighting direction (DI) which forms a 90° angle with the direction of detection (DD). The first face (2b) has an "immersion" objective lens (9b) coupled thereto which crosses through the wall of said face (2b) such that the front end thereof is immersed in the fluid supporting the sample (7). The second face (2b') is a transparent face (2b') free of any obstacles that could hinder the passage of the light. In this position, images are acquired from the sample (7) by means of the objective lens (9b) in the conventional manner: a planar light beam (6) is emitted in the lighting direction (DI); the planar light beam (6) crosses through the second transparent face (2b') and reaches the sample (7); the sample emits a fluorescent light (8) in the direction of detection (DD); the objective lens (9b) fastened to the first face (2b) receives the fluorescent light (8).

The cuvette (2) of FIGS. 2a and 2b has three more pairs of faces which are not in use, a pair of faces (2a, 2a'), a pair of faces (2c, 2c'), and a pair of faces (2d, 2d'):

Pair of faces (2a, 2a'): The face (2a) is adjacent to the face (2b) in the clockwise direction, and also has an "immersion" objective lens (9a) fastened thereto. The corresponding face (2b) is adjacent to the face (2b) in the counterclockwise direction, and is transparent in order to allow the light to pass through. The face (2a) forms a 90° angle with the face (2a').

Pair of faces (2b, 2b'): The face (2c) is adjacent to the face (2b') in the counterclockwise direction, and also has an "immersion" objective lens (9c) fastened thereto. The corresponding face (2c') is separated from the face (2c) in the clockwise direction by the face (2d), and is transparent in order to allow the light to pass through. The face (2c) forms a 90° angle with the face (2c').

Pair of faces (2d, 2d'): The face (2d) is adjacent to the face (2c) in a counterclockwise direction, and has an "immersion" objective lens (9d) fastened thereto. The corresponding face (2d) is adjacent to the face (2b) in the clockwise direction, and is transparent in order to allow the light to pass through. The face (2d) forms a 90° angle with the face (2d').

FIGS. 3a-3d show the four possible use positions of the cuvette (2) shown in FIGS. 2a-2b. Each of these use positions corresponds to a rotation angle of the cuvette (2) about an axis perpendicular to the plane containing the lighting direction (DI) and the direction of detection (DD). FIG. 3a shows a top view of the cuvette (2) wherein the objective lens (9a) fastened to the wall of the face (2a) is oriented in the direction of detection (DD). The other side (2a) of that pair of faces is oriented in the lighting direction (DI). Therefore, the objective lens (9a) is in the active or use position. When the user wants to use the objective lens (9d), it is only necessary to rotate the cuvette (2) 135° in the counterclockwise direction. A position is then reached wherein the objective lens (9d) fastened to the wall of the face (2d) is oriented in the direction of detection (DD), as shown in FIG. 3B. Correspondingly, the other face (2d') of that pair of faces is oriented in lighting direction (DI). Therefore, the objective lens (9d) is now in the active or use position. In order to use the objective lens (9c), the cuvette (2) is rotated an additional 45° (180° in relation to the initial position shown in FIG. 3a). The objective lens (9c) fastened to the face (2c) is now oriented in the direction of detection (DD), and the other face (2c') of that pair of faces is oriented in the lighting direction (DD). Finally, in order to use the objective lens (9a), the cuvette (2) is rotated an additional 135° (315° in relation to the initial position shown in FIG. 3a). The face (2a) on which the objective lens (9a) is located is now oriented according to the direction of detection (DD).

Figure 4A:
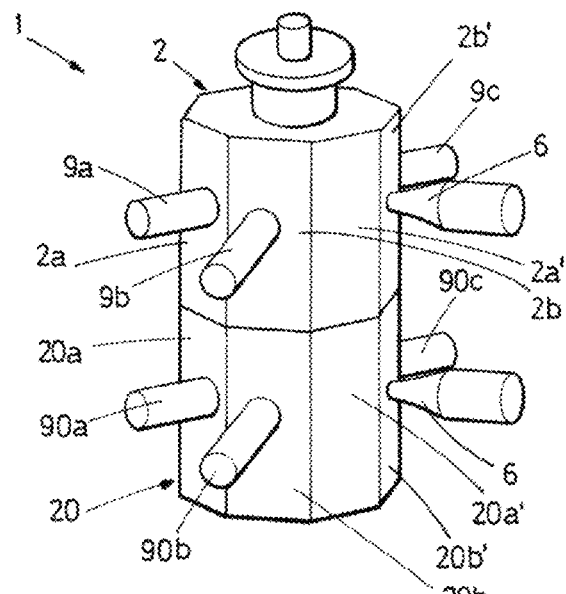
FIGS. 4a and 4b respectively show a perspective view and a top view of the main elements of a second example of a device according to the present invention.
Figure 4B:
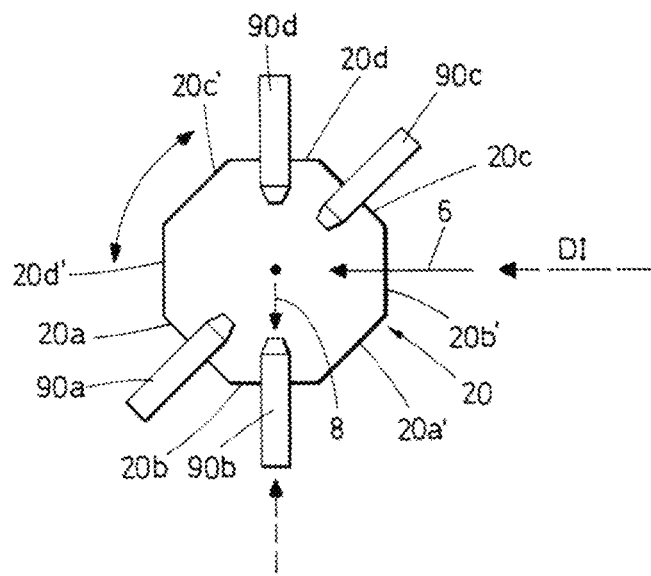

FIG. 4a shows a second example of a device (1) according to the invention comprising a cuvette (2) which will be called the main cuvette and an identical additional cuvette (20) arranged beneath the main cuvette (2). The faces (20a, 20a'; 20b, 20b'; 20c, 20c'; 20d, 20d') of the cuvette (20) are coplanar with the faces (2a, 2a'; 2b, 2b'; 2c, 2c'; 2d, 2d') of the cuvette (2), and both cuvettes are fastened together such that they rotate in an integral manner. The additional cuvette (20) also has objective lenses (90a, 90b, 90c, 90d) arranged on the faces (20a, 20b, 20c, 20d) which are coplanar with the faces (2a, 2b, 2c, 2d) equipped with an objective lens (9a, 9b, 9c, 9d) of the main cuvette (2). This is seen in greater detail in FIG. 4b, which schematically shows a top view of a cross section of the additional cuvette (20). Thanks to this configuration, images of a large sample (7) can be acquired simultaneously. To do so, two planar lighting sheets (6) can be used which strike the sample (7) in the lighting direction (DI) after crossing through the respective faces (2b', 20b'). The fluorescent light (8) emitted by the sample (7) is received through corresponding objective lenses (9b, 90b) arranged on the respective other faces (2b, 20b) of said pairs of perpendicular faces. In order to switch the objective lens, the cuvette (2)-additional cuvette (20) assembly is rotated in the same manner as described above in relation to the first example of a device (1).

What is claimed is:

1. A rotary objective lens switching device for a planar laser beam microscope, comprising a cuvette having a shape of a prism with an axis perpendicular to a plane parallel to a direction of detection (DD) and a lighting direction (DI) which are mutually perpendicular, wherein a cross-sectional shape of the prism parallel to said plane is a polygon with more than four sides which has pairs of mutually perpendicular faces, wherein each of at least several pairs of mutually perpendicular faces comprise one face designed to receive a planar light beam in order to illuminate a sample according to the lighting direction (DI) and a face with a coupled lens or objective lens to detect a fluorescent light emitted by the sample in the direction of detection (DD), and wherein the cuvette can rotate about an axis perpendicular to said plane, allowing a specific lens or objective lens to be oriented in the direction of detection (DD).

2. The device according to claim 1, wherein the polygon is a regular polygon with a number of faces that is a multiple of four.

3. The device according to claim 2, wherein the regular polygon is an octahedron, a dodecahedron, or a hexadecahedron.

4. The device according to claim 1, wherein the face designed to receive a planar light beam in order to illuminate a sample in the lighting direction (DI) is a planar transparent face.

5. The device according to claim 1, wherein the face designed to receive a planar light beam in order to illuminate a sample in the lighting direction (DI) comprises a lighting objective lens.

6. The device according to claim 5, wherein the lighting objective lens is an immersion lighting objective lens.

7. The device according to claim 5, wherein the lighting objective lens is an air lighting objective lens.

8. The device according to claim 1, wherein a front end of at least one objective lens crosses through a wall of the face to which it is coupled.

9. The device according to claim 1, wherein a front end of at least one objective lens is externally adjacent to a wall of the face to which it is coupled.

10. The device according to claim 1, comprising at least one additional cuvette which has the same cross-sectional shape as the cuvette and which is fastened to said cuvette such that each face of the additional cuvette is coplanar with a corresponding face of the cuvette, wherein faces of the additional cuvette coplanar with faces with the lens or objective lens of the cuvette have a coupled lens or objective lens, and wherein the cuvette and the additional cuvette can rotate in an integral manner such that it is possible to simultaneously orient a specific lens or objective lens of the cuvette and a specific lens or objective lens of the additional cuvette in the direction of detection (DD).

* * * * *